United States Patent [19]

Vroemen

[11] 3,855,064
[45] Dec. 17, 1974

[54] PREPARATION OF A PROTEOLYTIC ENZYME

[75] Inventor: Albert Joseph Vroemen, Schipluiden, Netherlands

[73] Assignee: Gist-Brocades N.V., Delft, Netherlands

[22] Filed: Oct. 3, 1972

[21] Appl. No.: 294,602

[30] Foreign Application Priority Data
Oct. 6, 1971 Great Britain .................... 46508/71

[52] U.S. Cl. ................................................ 195/65
[51] Int. Cl. .......................................... C12d 13/10
[58] Field of Search ............................ 195/65, 66 R

[56] References Cited
UNITED STATES PATENTS
3,674,643   7/1972   Aunstrup et al. ..................... 195/62

OTHER PUBLICATIONS
Manual of British Water Supply Practice, 1950, pages 566–570.

Primary Examiner—Lionel M. Shapiro
Attorney, Agent, or Firm—Hammond & Littell

[57] ABSTRACT

Process for the preparation of a proteolytic enzyme comprising the steps of aerobically cultivating a Bacillus alcalophilus strain in a culture medium containing assimilable carbon and nitrogen sources and conventional compounds used in trace or small amounts in microorganism fermentation media, the medium containing less than about 35 mg of $SO_4^{--}$ per liter while maintaining the pH of the medium between about 7 and 11 during the cultivation, and recovering the proteolytic enzyme produced whereby the yield of enzyme is considerably increased due to the low concentration of the sulfate ion in the culture medium.

12 Claims, No Drawings

PREPARATION OF A PROTEOLYTIC ENZYME

STATE OF THE ART

Vedder [Antonie van Leeuwenhoek Vol. 1, pages 141–147 (1934)], disclosed that strains of *Bacillus alcalophilus* produce proteolytic enzymes which can proteolytically decompose inter alia gelatin and hemoglobin, and this fact has been corroborated by later work disclosed in British Pat. No. 1,205,403. Samples of a strain of *Bacillus alcalophilus* have been deposited and are available on request from the National Collection of Type Cultures in London under the NCTC Number 4553 and in the National Collection of Industrial Bacteria in Aberdeen under the NCIB Number 8772.

The strains of *Bacillus alcalophilus* such as NCTC 4553 or NCIB 8772 can be cultivated at a relatively high pH, preferably between about 7 and 11, and have an optimal growth at a pH between 7.8 and 9.0. The yield of proteolytic enzyme generally produced by *Bacillus alcalophilus* is rather low, and is insufficient for commercial exploitation of the enzyme for use in biologically active washing compositions for example.

OBJECTS OF THE INVENTION

It is an object of the invention to provide an improved process for the production of a proteolytic enzyme with a strain of *Bacillus alcalophilus*.

It is a further object of the invention to provide a process for production of a proteolytic enzyme in high yields with *Bacillus alcalophilus* with lower sulfate ion concentration in the culture medium.

These and other objects and advantages of the invention will become obvious from the following detailed description.

THE INVENTION

The novel process of the invention for the production of a proteolytic enzyme comprises aerobically cultivating a *Bacillus alcalophilus* strain in a culture medium containing assimilable carbon and nitrogen sources and conventional compounds used in trace or small amounts in microorganism fermentation media, the medium containing less than about 35 mg of $SO_4^{--}$ per liter, preferably less than about 15 mg of $SO_4^{--}$ per liter, while maintaining the pH of the medium between about 7 and about 11 during the cultivation, and recovering the proteolytic enzyme produced.

The crux of the invention resides in the fact that the yield of the proteolytic enzyme by *Bacillus alcalophilus* is influenced greatly by the sulfate ion content of the culture medium, higher concentration of sulfate ion giving lower yields. Therefore the yield of proteolytic enzyme is considerably increased by a reduction in the concentration of the sulfate ion in the culture medium.

Tap-water generally contains a sulfate ion concentration higher than 35 mg/l and in Delft, Holland for example it normally contains about 70 mg of $SO_4^{--}$ per liter. It cannot therefore normally be used as the solvent for the culture medium of the invention to obtain the higher yields of proteolytic enzyme. Distilled or deionized water is preferably used for preparing the culture medium, and then the necessary assimilable carbon and nitrogen sources and other usual compounds are added taking care, of course, that the sulfate ion content is rigorously controlled and kept to a minimum and at most below 35 mg/l.

During the cultivation of the *Bacillus alcalophilus*, the pH of the medium should be kept between about 7 and about 11, preferably between 7.8 and 10.0, and this can be done, for example, by using a buffer solution such as a carbonate buffer solution, while if necessary an alkaline solution such as sodium hydroxide solution or an acid solution such as hydrochloric acid solution can be added during the cultivation to maintain the pH between the above-mentioned limits and at predetermined values.

Examples of suitable sources of assimilable carbon are the carbon sources usually used in fermentations such as carbohydrates, like saccharose, glucose, starch and malt. The range to the carbohydrate concentration in the culture medium is broad and may be 1 to 25% by weight calculated as dextrose, preferably 5 to 25% although the usual concentration is about 8 to about 10%. The carbohydrate produces acid compounds during the fermentation which causes a decrease in the pH and consequently steps may be required to maintain the pH of the culture medium between the aforementioned limits during fermentation, for example as described above.

The sources of assimilable nitrogen for the culture medium may be of organic nature such as soybean meal, cottonseed meal, peanut meal, casein, animal meat protein, corn steep liquor, yeast, yeast extracts and albumin or mixtures of two or more of the said sources.

The nutrient culture medium must also contain known compounds in small or trace amounts which are usually incorporated in fermentation culture media such as water soluble compounds of Ca, Mg, Mn, Fe, K, Co, Cu, Zn, B, Mo, Br and I. Other trace-elements may be present, but are not essential. To keep the sulfate ion concentration in the culture medium as low as possible, the compounds are preferably not sulfates and chlorides and nitrates are satisfactory salts for the addition of the metals. The said trace-elements should be added to the culture medium to supplement to a sufficient extent the trace-elements present in varying amounts in natural carbon and nitrogen sources constituting part of the culture medium.

The temperature used for the cultivation of *Bacillus alcalophilus* in the process of the invention is normally within the same range as is usual for known fermentations of known species of the genus Bacillus. A suitable temperature range is 20° to 40°C, and preferably 25° to 37°C. On a small scale, shaking using baffled shake flasks is usually adequate to provide sufficient air for the fermentation, but extra air may be added if desired. Artifical aeration is essential for fermentation in tanks and the quantities of air are similar to those used in known fermentations, e.g., about 4 liters of air per minute with a stirring rate of 1,200 rpm for a stainless-steel fermenter of 15 liters containing 4.5 liters of medium.

Generally, the highest yields of enzyme are obtained with a fermentation period of about 1 to 5 days.

The enzyme produced by the fermentation is isolated and purified if necessary or desired by known methods. It may be used as a component of biologically active washing compositions in conjunction with surface active agents, builders and optionally other conventional additives.

In the following examples there are described several preferred embodiments to illustrate the invention. However, it should be understood that the invention is not intended to be limited to the specific embodiments.

The activity of an enzyme is given in DU(Delft Units) in the following examples and one unit is a quantity of enzyme which is able to perform a specific chemical reaction in a certain time interval. The reaction conditions greatly influence the determination of the activity. The activity is preferably determined under such conditions as can be expected in washing liquids because some proteases are frequently used in washng powders. For this reason, the determination is performed in the presence of sodium tripolyphosphate as this salt is present in most washing powders. Furthermore, the pH and the temperature are adjusted to washing conditions. The determination of the activity in Delft Units takes place by measuring the reaction of the enzyme on casein.

To determine the activity of the enzyme, the following reagents are used:

Reagent A : 0.433 g of $CaCl_2.6H_2O$, 1.40 g of $MgCl_2.6H_2O$ and 2.10 g of $NaHCO_3$ dissolved in distilled water and diluted to 1 liter and has a German Hardness of 15°.

Reagent B : 36.34 g of tris-hydroxymethylaminomethane dissolved in sufficient Reagent A to make 1 liter.

Reagent C : 20.0 g of sodium tripolyphosphate, 0.433 g of $CaCl_2.6H_2O$, 1.40 g $MgCl_2.6H_2O$ and 2.10 g of $NaHCO_3$ dissolved in distilled water to make 1 liter, acidified with 10% HCl to a solution of pH 8.5.

Reagent D : 18.0 g of trichloroacetic acid, 30.0 g of sodium acetate. $3H_2O$, 30.0 g of glacial acetic acid and 0.2 ml of Tween-80 dissolved in distilled water in the order given and diluted to 1 liter.

Reagent E : 36.0 g of casein were dissolved in 2.5 liters of Reagent A with stirring and stirring was continued for 10 minutes. 300 ml of Reagent B were then added and the mixture was stirred again for 10 minutes. Then, the mixture was heated on a water-bath at 7°C while stirring was continued until the temperature reached 40°C. At that temperature, the pH was adjusted to 8.5 with a 1N NaOH solution and after cooling to room temperature, the mixture was adjusted to a volume of 3 liters with Reagent A and the solution was stirred once again. This solution is suitable for use for one day provided it is stored in a refrigerator.

The protease activity was determined as follows:

A weighed quantity of a homogeneous enzyme preparation or a known quantity of fermentation broth or filtrate was dissolved in or diluted with a suitable amount of Reagent C and the pH of this solution was adjusted to 8.5 at room temperature by adding 1N NaOH or 1N HCl. The enzyme concentration of the solution had to be chosen so that the activity of the solution was about 20 to 30 DU of protease per ml. This solution must not be kept for longer than two hours. The enzyme solution, Reagent E and some centrifuge tubes were heated on a water-bath to a temperature of 40°C exactly and 1 ml of the enzyme solution, was pipetted into a centrifuge tube. When this solution had reached the desired temperature of 40°C, 5 ml of Reagent E were pipetted into the centrifuge tube and thoroughly mixed with the enzyme solution. The mixture was allowed to react for exactly 40 minutes and then, 5 ml of Reagent D were pipetted into the tube and mixed with the solution. The tube was placed on a water-bath for 30 minutes to allow the precipitate to coagulate and the tube was now centrifuged for 15 minutes.

For every enzyme solution, a blank test was performed by pipetting 5 ml of Reagent D into a centrifuge tube, heating the solution to 40°C and adding 1 ml of enzyme solution and 5 ml of Reagent E. The content of the tubes were mixed thoroughly, and then, the tube was placed in a water-bath for 30 minutes after which the tube was centrifuged for 15 minutes.

The optical density of the clear solution was measured in a UV-spectrophotometer at 275 m$\mu$ with distilled water as a reference. The difference between the optical density of the test solution and the blank solution ($\Delta$ OD) should amount to about 0.4 to 0.6. A too high or too low difference requires a new test with a more dilute or more concentrated enzyme solution. The activity of the enzyme expressed in DU/g of enzyme-containing material is calculated as follows:

$$50 \times \Delta OD \times \text{dilution factor}$$

wherein the dilution factor is the ratio between the total number of ml of enzyme solution and the weight of the sample in grams. The number 50 is a conversion factor.

EXAMPLE 1

Cultivation of *Bacillus alcalophilus* NCIB 8772 was carried out in baffled shaker flasks containing 100 ml of media based on distilled water and the results were compared with those on media based on tap-water. A solution was prepared by dissolving 9.4 g of casein, 2 g of yeast extract and 10 g of $K_2HPO_4$ in water and the solution was made up to 700 ml with water and its pH was 8.5. The solution was sterilized by heating at 120°C for 20 minutes.

A second solution was prepared by dissolving 0.16 g of $CaCl_2.6H_2O$, 0.58 g of $MgCl_2.6H_2O$, 0.010 g of $MnCl_2.4H_2O$, 0.005 g of $FeCl_3.6H_2O$, 25 g of saccharose and 1.4 g of citric acid in water, and the solution was made up to 200 ml with water. Its pH was adjusted to 6.0 with an aqueous sodium hydroxide solution and the solution was sterilized by heating at 120°C for 20 minutes. Another solution was prepared by dissolving 10.6 g of sodium carbonate in water and the solution after being made up to 100 ml with water was sterilized by heating at 120°C for 20 minutes. The three above-mentioned sterilized solutions were mixed together to form 1 liter of basal solution.

The inoculation culture used was a culture of the aforesaid *Bacillus alcalophilus* strain in Trypton Soya Broth containing 0.1 mol/l of sodium carbonate fermented in a shaken thermostat at 35°C for 24 hours. The fermentations were carried out at about 35°C with the basal media derived from tap-water which contained 69 mg of $SO_4^{--}$ per liter, and with the basal media derived from distilled water, in each case with and without addition of 50 mg of anhydrous sodium sulfate per liter. During the fermentations, alkaline or acid solutions were not added and the initial and final pHs were 9.8 and 7.8 respectively. The flasks were incubated on a shaken thermostat at 220 rpm. The results are shown in Table I.

TABLE I

| Medium | $Na_2SO_4$ added | $SO_4^{--}$ mg/l | Maximum Enzyme Yield expressed as activity.DU/ml | Hours of Fermentation |
|---|---|---|---|---|
| Tap-water | — | 69 | 1100 | 28 |
| Tap-water | 50 | 104 | 950 | 32 |
| Dist.water | — | 0 | 3300 | 28 |
| Dist.water | 50 | 35 | 1200 | 28 |

The results of Table I show that higher yields are produced by the use of distilled water than tap-water, and that the complete absence of sulfate ions gives the highest yield.

EXAMPLE 2

The effect on enzyme activity by varying the sulfate ion concentration in the culture medium was studied. The fermentation of Bacillus alcalophilus NCIB 8772 was carried out in vessels containing basal media made up from distilled water. A solution was prepared by dissolving 10 g of casein, 1.4 g of yeast extract, 1.5 g of $KH_2PO_4$ and 4.5 g of KCl in water and the solution was made up to 700 ml with distilled water. Its pH was adjusted to 8.5 with an aqueous sodium hydroxide solution and this solution was sterilized by heating at 120°C for 20 minutes.

A second solution was prepared by dissolving 18.5 g of saccharose, 0.5 g of citric acid, 0.05 g of $CaCl_2.6H_2O$, 0.20 g of $MgCl_2.6H_2O$, 0.003 g of $MnCl_2.4H_2O$, 0.0016 g of $FeCl_3.6H_2O$, 0.0007 g of $CoCl_2.6H_2O$, 0.0009 g of $CuCl_2.2H_2O$, 0.0007 g of $ZnCl_2$, 0.0001 g of $Na_2B_4O_7.10H_2O$, 0.00005 g of $Na_2MoO_4.2H_2O$, 0.0001 g of KBr and 0.0002 g of KI in distilled water and the solution was made up to 200 ml with distilled water. Its pH was 6.0 and this solution was sterilized by heating at 120°C for 20 minutes.

Another solution was prepared by dissolving 10.6 g of sodium carbonate in distilled water and the solution after being made up to 100 ml with distilled water was sterilized by heating at 120°C for 20 minutes.

The three above-mentioned sterilized solutions were mixed together to form 1 liter of basal solution. The inoculation culture used was a culture obtained by fermenting the aforesaid Bacillus alcalophilus strain for 16 hours in Trypton Soya Broth containing 0.1 Mol/l of sodium carbonate buffer in a shaken thermostat at 35°C. The fermentation conditions were the same as in Example 1 and the results are shown in Table II.

TABLE II

| $Na_2SO_4$ added to the basal medium mg/l | $SO_4^{--}$ mg/l | Maximum Enzyme Yield expressed as activity DU/ml | Hours of Fermentation |
|---|---|---|---|
| — | 0 | 6,300 | 22 |
| 30 | 21 | 2,800 | 22 |
| 100 | 70 | 1,200 | 22 |

The results show that decreasing amounts of sulfate ions in the medium result in increased yields.

EXAMPLE 3

The effect on enzyme yield of large variations in sulfate ion concentrations in the culture medium was studied and the fermentations were carried out in media prepared in the following way. A solution was prepared by dissolving 280 g of casein, 40 g of corn steep solids and 100 g of $K_2HPO_4$ in distilled water and the solution was made up to 7 liters with distilled water. Its pH was 8.5 and this solution was sterilized by heating at 120°C for 20 minutes.

A second solution was prepared by dissolving 800 g of saccharose, 7 g of citric acid, 1.6 g of $CaCl_2.6H_2O$, 5.8 g of $MgCl_2.6H_2O$, 0.09 g of $MnCl_2.4H_2O$, 0.048 g of $FeCl_3.6H_2O$, 0.020 g of $CoCl_2.6H_2O$, 0.027 g of $CuCl_2.2H_2O$, 0.020 g of $ZnCl_2$, 0.004 g of $Na_2B_4O_7.10H_2O$, 0.001 g of $Na_2MoO_4.2H_2O$, 0.002 g of KBr, and 0.005 g of KI in distilled water and the solution was made up to 2 liters with distilled water. Its pH was adjusted to 6.0 with an aqueous sodium hydroxide solution and this solution was sterilized by heating at 120°C for 20 minutes. Another solution was prepared by dissolving 106 g of sodium carbonate in distilled water and the solution after being made up to 1 liter with distilled water was sterilized by heating at 120°C for 20 minutes.

The three above-mentioned sterilized solutions were mixed together to form 10 liters of basal solution. The fermentation was carried out at about 35°C in a 15 liter stainless steel fermenter with 4.5 liters of medium. During the fermentation, the contents were aerated with 4 l. of air per minute and the contents stirred with a propeller stirrer at a speed of 1,200 rpm. Sodium hydroxide solution was added to ensure that the pH did not fall below 8.0. The strain of Bacillus alcalophilus and the inoculation culture were the same as in Example 1. The results of adding increasing amounts of $SO_4^{--}$ to the media are shown in Table III.

TABLE III

| $Na_2SO_4$ added to the basal medium mg/l | $SO_4^{--}$ mg/l | Maximum Enzyme Yield expressed as activity DU/ml | Hours of Fermentation |
|---|---|---|---|
| — | 0 | 20,700 | 24 |
| — | 0 | 20,600 | 24 |
| 100 | 70 | 8,000 | 28 |
| 300 | 211 | 7,100 | 28 |
| 1000 | 700 | 6,000 | 32 |
| 3000 | 2110 | 5,880 | 28 |

The results of Table III show that decreased amounts of sulfate ion in the medium result in increased yields of enzyme.

EXAMPLE 4

The effect of an addition of 30 mg of $Na_2SO_4$ per liter on enzyme yield was tested with three different Bacillus alcalophilus strains, samples of which are deposited and publicly available:
1. NCTC 4553 or NCIB 8772
2. ATCC 21,522
3. ATCC 21,536

Samples of strains ATCC 21,522 and ATCC 21,536 are held at the American Type Culture Collection, Rockville, Md., United States of America. The test was carried out as described in Example 2 except that the saccharose was replaced by an equal amount of dextrin. The results are shown in Table IV.

TABLE IV

| Strain | $SO_4^{--}$ mg/l | Maximum Enzyme Yield expressed as activity DU/ml | Hours of Fermentation |
|---|---|---|---|
| 1) | 0 | 7,700 | 24 |
| 1) | 21 | 3,700 | 24 |
| 2) | 0 | 7,400 | 24 |
| 2) | 21 | 4,200 | 24 |
| 3) | 0 | 8,100 | 24 |
| 3) | 21 | 3,100 | 24 |

Table IV shows that with the strains tested decreasing amounts of the sulfate ion in the medium results in increasing yields of enzyme. *Bacillus* strains growing in the pH range of 7 to 11 that do not show the sulfate ion effect have not been found.

Various modification of the process may be made without departing from the spirit or scope thereof and it is to be understood that the invention is to be limited only as defined in the appended claims.

I claim:

1. In a process for the preparation of a proteolytic enzyme of aerobically cultivating a *Bacillus alcalophilus* strain in a culture medium containing assimilable carbon and nitrogen sources and conventional compounds used in trace of small amounts in microorganism fermentation media, while maintaining the pH of the medium between about 7 and about 11 during the cultivation, and recovering the proteolytic enzyme produced, the improvement comprising maintaining a $SO_4^{--}$ content of less than 15 mg per liter in the culture medium.

2. The process of claim 1 wherein the medium contains 0 mg of $SO_4^{--}$ per liter.

3. The process of claim 1 wherein the pH of the medium is maintained between 7.8 and 10.0 during the cultivation.

4. The process of claim 1 wherein the assimilable carbon source is a carbohydrate selected from the group consisting of saccharose, glucose, starch and malt.

5. The process of claim 4 wherein the carbohydrate concentration is 1 to 25% by weight calculated as dextrose.

6. The process of claim 4 wherein the carbohydrate concentration is 5 to 25% by weight calculated as dextrose.

7. The process of claim 4 wherein the carbohydrate concentration is about 8 to about 10% by weight calculated as dextrose.

8. The process of claim 1 wherein the assimilable nitrogen source is selected from the group consisting of soybean meal, cottonseed meal, peanut meal, casein, animal meat protein, corn steep liquor, yeast, yeast extracts and albumin and mixtures of at least two of said sources.

9. The process of claim 1 wherein the compounds used in small or trace amounts are water-soluble compounds of at least one element selected from the group consisting of Ca, Mg, Mn, Fe, K, Co, Cu, Zn, B, Mo, Br and I.

10. The process of claim 1 wherein the cultivation temperature is between 20° and 40°C.

11. The process of claim 1 wherein the cultivation temperature is between 25° and 37°C.

12. The process of claim 1 wherein the fermentation period is about 1 to 5 days.

* * * * *